(No Model.) 2 Sheets—Sheet 1.
F. A. HOWARD & J. H. LEONARD.
SULKY PLOW.

No. 464,634. Patented Dec. 8, 1891.

(No Model.) 2 Sheets—Sheet 2.

F. A. HOWARD & J. H. LEONARD.
SULKY PLOW.

No. 464,634. Patented Dec. 8, 1891.

Witnesses:

Inventors
John H. Leonard &
Francis A. Howard,
By their Attorneys,

UNITED STATES PATENT OFFICE.

FRANCIS ALBERT HOWARD AND JOHN HENRY LEONARD, OF VERDELLA, MISSOURI.

SULKY-PLOW.

SPECIFICATION forming part of Letters Patent No. 464,634, dated December 8, 1891.

Application filed June 24, 1891. Serial No. 397,326. (No model.)

*To all whom it may concern:*

Be it known that we, FRANCIS ALBERT HOWARD and JOHN HENRY LEONARD, citizens of the United States, residing at Verdella, in the county of Barton and State of Missouri, have invented a new and useful Sulky-Plow, of which the following is a specification.

This invention relates to plows; and it has for its object to provide a sulky attachment for this class of plows which shall possess superior advantages in point of simplicity, durability, and general efficiency, and which shall admit of easy and convenient adjustment to cause the plow to run to any desired depth in the ground.

With these ends in view the invention consists in the improved construction, arrangement, and combination of parts, which will be hereinafter fully described, and particularly pointed out in the claims.

Figure 1:
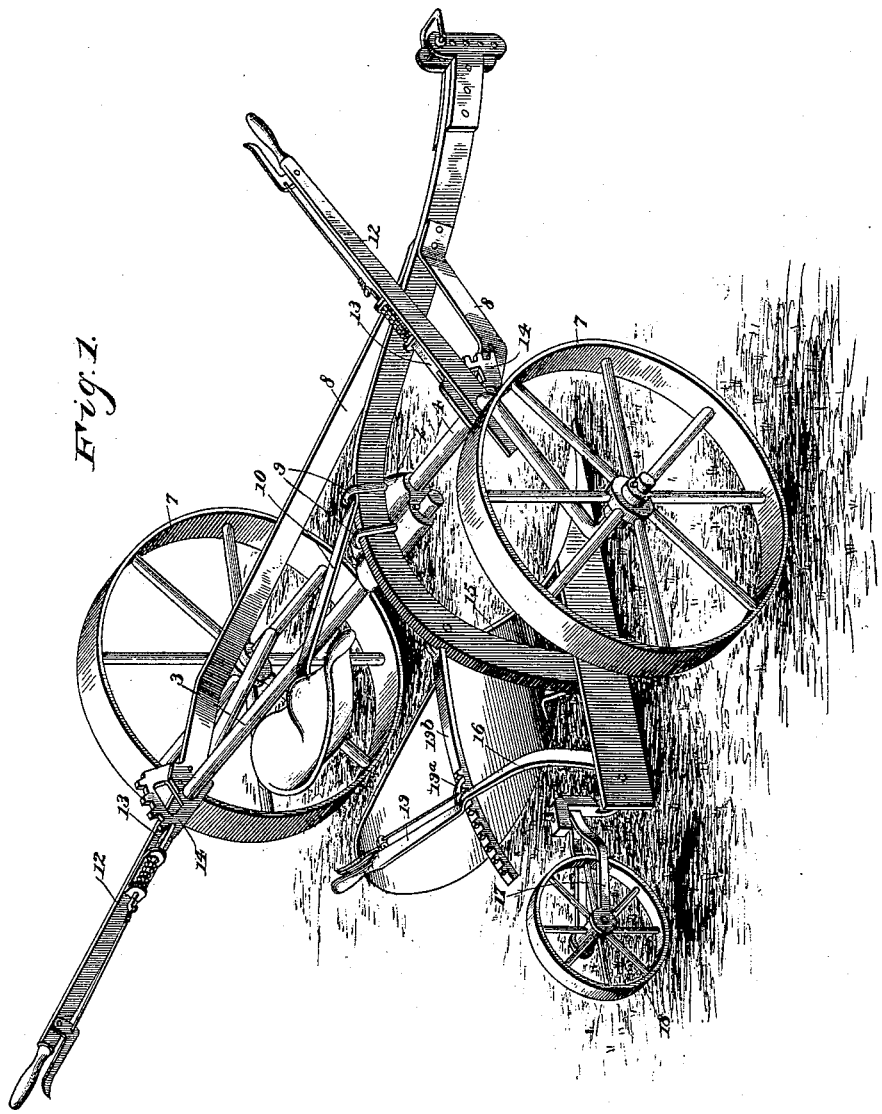
Figure 2:
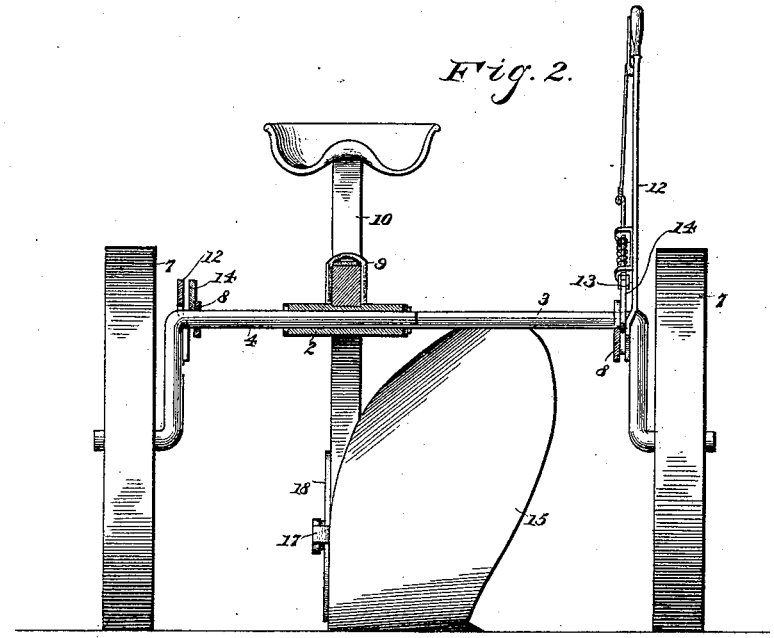
Figure 3:
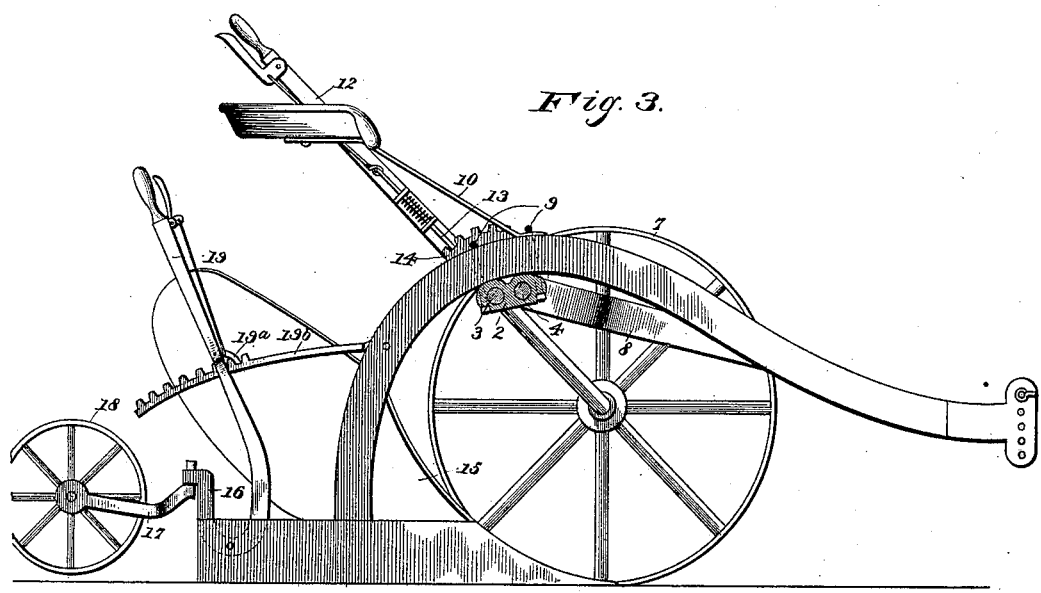

In the accompanying drawings, Figure 1 is a perspective view of a sulky-plow constructed in accordance with our invention. Fig. 2 is a vertical transverse sectional view. Fig. 3 is a longitudinal sectional view.

Like numerals of reference indicate like parts in all the figures.

To the under side of the plow-beam, which is designated by 1, is secured a block or casting 2, which is provided with bearings for a pair of independent shafts or axles, which are designated, respectively, by 3 and 4. The said shafts or axles are provided at their outer ends with cranks having spindles upon which the transporting-wheels 7 are journaled. The plow-beam is provided with arms or brackets 8 having bearings for the shafts or axles. The block or casting 2 is attached to the plow-beam by means of clips 9, which also serve for the attachment of the seat-bar 10, upon which the driver's seat is mounted. The shafts or axles 3 and 4 are provided with adjusting-levers 12, having suitably-constructed spring-actuated latches 13, adapted to engage the toothed segment 14 for the purpose of retaining the said shafts or axles in any position to which they may be adjusted.

15 designates the plow, the landside of which is provided at its rear end with a pivoted arm or bracket 16, having an upwardly-extending short arm provided with a pivoted yoke 17, in which a caster-wheel 18 is journaled. The pivoted arm 16 has an upwardly-extending and laterally-bent lever or handle 19, provided with a gravity-latch $19^a$, engaging with a toothed ratch-bar $19^b$, by means of which it may be adjusted to raise or lower the caster-wheel, as may be desired, thus regulating the depth to which the plow shall be permitted to enter the ground.

From the foregoing description, taken in connection with the drawings hereto annexed, the operation and advantages of our invention will be readily understood. The transporting-wheels are easily and independently adjusted, as well as the caster-wheel which trails behind the plow, thus permitting the latter to be very easily adjusted and governed. The entire sulky attachment is very simple and may be readily attached to the beam of an ordinary plow. It will be seen that the bracket-arm 16 is pivoted at its bend and serves as the support of the trailing-wheel and as the operating-lever.

Having thus described our invention, we claim and desire to secure by Letters Patent of the United States—

1. The combination, with the beam, of the opposite braces bolted at their front ends to the sides of the beam and having their rear ends diverged and bent parallel to the beam and provided with bearing-openings, the doubly-bored bearing-casting secured to the beam between the rear ends of the braces, the independent crank-axles journaled in the casting and braces and carrying ground-wheels, the levers having spring-latches mounted on the axles at the sides of the braces, and the segmentally-toothed locking-plates mounted on the ends of said braces, substantially as specified.

2. The combination, with the beam and plow, of a lever having its lower end bent into U form and pivoted to the landside of the plow, the lower rear extremity of said lever being rearwardly bent and perforated, a bifurcated wheel-carrying yoke having a bearing-pin swiveled in the perforation of the lever, a toothed bar secured to and rearwardly extending from its beam, and a catch mounted on the lever and adapted to engage the said toothed bar, substantially as specified.

In testimony that we claim the foregoing as our own we have hereto affixed our signatures in presence of two witnesses.

FRANCIS ALBERT HOWARD.
JOHN HENRY LEONARD.

Witnesses:
M. D. SCHMALHORST,
O. F. DIXON.